United States Patent Office
3,313,750
Patented Apr. 11, 1967

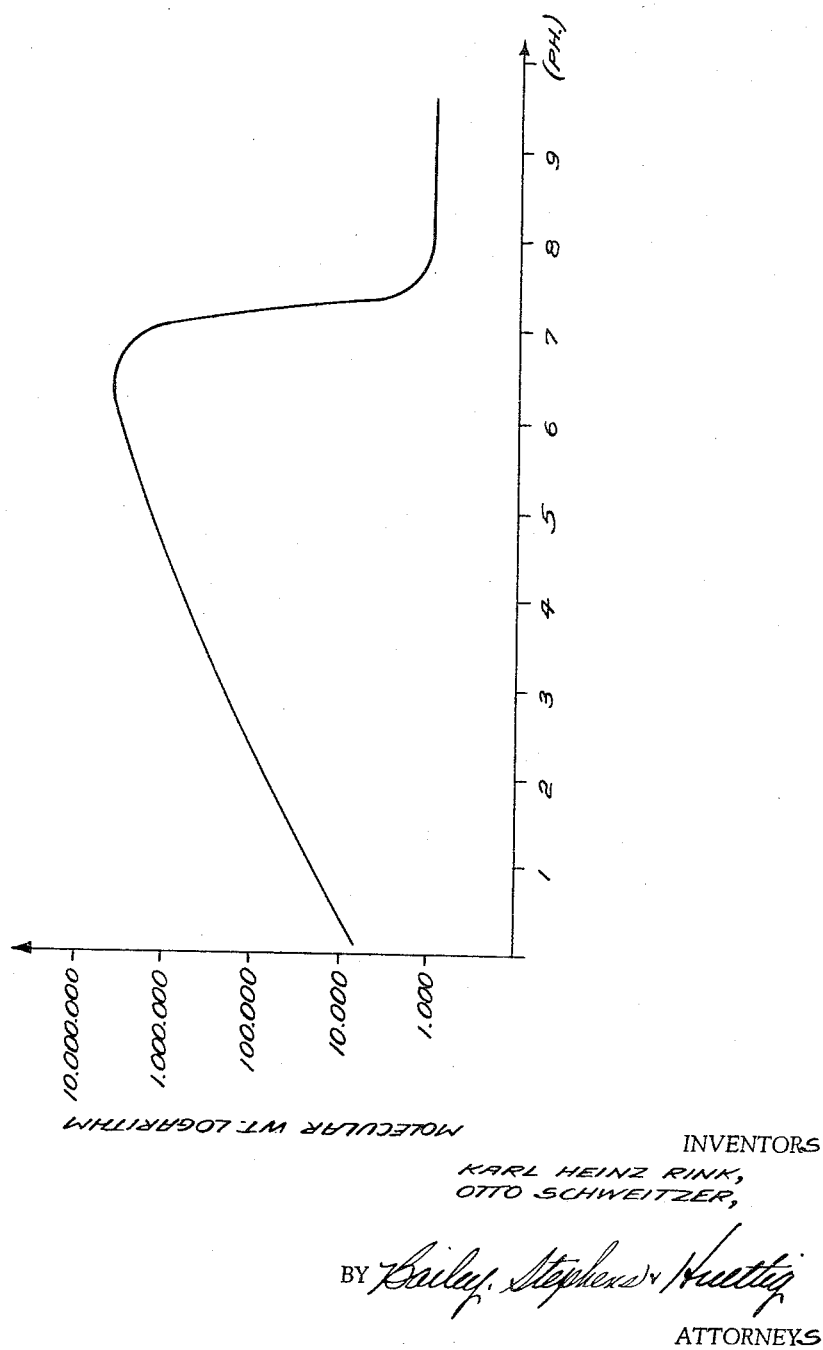

3,313,750
PRODUCTION OF POLYMERS OF ACROLEIN
Karl Heinz Rink, Hanau am Main, and Otto Schweitzer, Konigstein, Germany, assignors to Deutsche Gold- und Silber-Scheideanstalt vormals Roessler, Frankfurt am Main, Germany
Filed June 4, 1962, Ser. No. 199,902
Claims priority, application Germany, Aug. 25, 1960, D 34,096; June 3, 1961, D 36,249
7 Claims. (Cl. 260—8)

The present invention relates to an improved process for the production of polymers of acrolein and more particularly relates to a process for the polymerization of acrolein within the aid of an improved catalyst.

Various methods are known for the polymerization of acrolein with the aid of an improved catalyst. 790,385, filed Feb. 2, 1959, now Patent No. 3,068,203, it has been proposed to carry out such polymerization in an aqueous medium using sulfur dioxide or sulfurous acid as the catalyst. According to the latter process, about a 70% yield of polyacroleins having molecular weights of 30,000 to 50,000 is obtained as a maximum.

According to the present invention it was found that better yields of polyacroleins having molecular weights between about 1,000 up to 10,000,000 and higher can be obtained by polymerizing acrolein in an aqueous medium with the aid of a catalyst essentially composed of a polymeric compound containing sulfur dioxide or acid salts of sulfurous acid in bound form and if desired controlling the pH during the polymerization to produce polyacroleins of a predetermined molecular weight within said range.

The polymeric compounds which are capable of binding sulfur dioxide or hydrogen sulfites chemically or physically, for example, by adsorption, must either be water soluble or become water soluble upon addition of sulfur dioxide or acid salts of sulfurous acid. Suited polymers for instance are: polyvinyl carbazole, polyvinyl amine, gelatine, polyvinyl alcohol, polyglycol, cellulose polyethers, polyguanidines, polyacroleins, polyvinyl pyrrolidones and the like. It is advantageous in some instances to employ the polyacrolein sulfur dioxide addition product because of its similarity in type to the polyacroleins produced. The polymerization catalyst is employed in the form of an aqueous solution containing 1 to 50% of the polymeric component and 1 to 25% of the sulfur dioxide or the equivalent quantity of bisulfite. Preferably an aqueous solution containing 10 to 15% of polyacrolein and 5 to 10% of sulfur dioxide or the equiavlent quantity of a bisulfite, such as sodium bisulfite or calcium bisulfite, is employed as the catalyst solution. The quantity of aqueous catalyst solution employed calculated upon the quantity of acrolein to be polymerized is 0.5 to 10% by weight.

These polymer/$SO_2$ polymerization catalysts in the presence of water provide varying pH values depending upon the polymer composition, the $SO_2$ content, as well as the polymer/$SO_2$ catalyst concentration employed in the polymerization medium. According to the invention it was found that the molecular weight of the polyacrolein produced can be geratly influenced by the alteration of the pH of the polymerization medium and furthermore that polymers of substantially predetermined molecular weight can be obtained by proper adjustment of the pH of such medium as will be more fully described below. The pH adjustment may be effected by the addition of acids to provide a strongly acid medium as well as by the addition of bases to provide a medium which is only weakly acid or in the neutral region. In the strongly acid region, that is at a pH in the range of 1–3, as indicated in the graph shown in the drawing, polyacroleins of a molecular weight between 10,000 and 50,000 are produced. In the weakly acid range the molecular weight of the polyacroleins produced rises to up to about 10,000,000 at a pH of 6.8, and between this pH and to about 7.5 a sharp drop in the molecular weight is effected and any further displacement of the pH in the alkaline range polyacroleins of a molecular weight of only about 1,000 are obtained.

While measures other than the control of the pH of the polymerization medium may influence the molecular weight of the polyacrolein produced, such as selection of polymer component of the catalyst, catalyst concentration, presence of substances such as alcohols, the control of the pH predominates in determining the molecular weight of the polyacrolein produced. The variations caused by selection of polymer component and catalyst concentration may only cause a deviation at most of the order of up to 10% in the molecular weights indicated in the graphical representation of the dependency of the molecular weight of the polyacrolein produced upon the pH of the polymerization medium shown in the accompanying drawing.

For the polymerization according to the invention, the catalyst solution is added with stirring to a mixture of water and acrolein at temperatures between 0 and $+60°$ C., preferably at about $+20$ to $+30°$ C. When the catalyst solution has a low content of $SO_2$ or bisulfite (2 to 5% calculated as $SO_2$) it is possible that the polymer obtained after completion of the polymerization is retained as an emulsion polymer. If the calculated quantity of $SO_2$ in the catalyst solution is higher, for example, 10% and more, the emulsion polymer originally formed will precipitate. The quantity of water used as the reaction medium for the emulsion polymerization is also of significance with regard to the stability of the emulsion. As a consequence the polymerization can be carried out as an emulsion polymerization or a precipitation polymerization by suited selection of the proportions of the acrolein, water and catalyst, as well as the $SO_2$ or bisulfite content of the catalyst.

The pH of the polymerization medium can be adjusted to the desired value by addition of any compatible acid or base either organic or inorganic. Of course, those substances which maintain as contsant a pH as possible during the polymerization, such as buffer solutions or systems, are preferred. Additions of amines as a basic component as well as of amides and nitriles have proved well suited. The quantities of pH regulating substances employed of course depend upon the catalyst employed, its pH, its dilution, as well as upon desire pH to provide the molecular weight of polyacrolein desired.

Although the effect of the pH of the polymerization charge predominates, a polymerization charge which leads to a polyacrolein having, for example, a molecular weight between 600,000 and 700,000 will produce polyacroleins of lower molecular weight by the addition of mono- or polyhydric alcohols or sugars but without other alteration of the charge or the reaction conditions. Depending upon the type of alcohol and the quantity added the molecular weight of the polyacrolein can be reduced stepwise. When monohydric alcohols are added the yield of polyacrolein is lower than in the absence of such alcohol. The addition of polyhydric alcohols, that is, alcohols containing two or more hydroxy groups, or sugars, on the other hand, does not cause such a reduction in polyacrolein yield. Depending upon the type of alcohol or sugar employed and the desired reduction in molecular weight, 0.5 to 25% by weight of such alcohols or sugars based upon the quantity of acrolein contained in the charge may be added.

It is also possible to increase the molecular weight of the polyacrolein obtained according to the invention by the addition of polyacetals, such as polyformaldehyde, to the polymerization charge. For example, if a certain polymerization charge will produce polyacroleins having a molecular weight between 600,000 and 700,000 the molecular weight of the polyacrolein produced can be raised stepwise to over 1,000,000 by the addition of polyacetals and particularly polyformaldehyde without otherwise altering the polymerization conditions. Depending upon the desired increase in molecular weight of the polyacrolein produced the quantity of polyformaldehyde or other polyacetal added can be between 1 and 20% by weight with reference to the quantity of acrolein contained in the charge.

The polymerization of acrolein according to the invention requires several hours' stirring. The reaction is only weakly exothermic so that even with larger charges neither heating nor cooling is required.

The polyacroleins of the various molecular weights produced according to the invention are all of good solubility in aqueous $SO_2$ and such solutions can be employed to produce coatings. The emulsion polymers which are obtainable represent a very reactive form of polyacrolein because of the fine distribution thereof and is therefore especially suited for further reactions to produce derivatives, oxidation or reduction products, as well as graft polymers.

The following examples will serve to illustrate a number of embodiments of the invention.

EXAMPLE 1

75 cc. of distilled acrolein (purity 90.5%) were mixed with 100 cc. of water and 2 cc. of catalyst solution containing 10% of polyacrolein of a molecular weight of 40,000 and 5% of $SO_2$ dissolved in water added thereto with stirring at 20° C. The stirring was continued for 8 hours. A white emulsion formed after 30 minutes which signified the initiation of the polymerization. The reaction as it proceeded was only weakly exothermic and the temperature gradually rose to 27° C. in 2 hours and remained at such temperature until the end of the polymerization without requiring heating or cooling of the reaction mixture. After 5 hours the emulsion polymer started flocking out and after 8 hours the entire reaction mixture solidified to a solid white mass. It was allowed to stand overnight and was scraped out of the reaction vessel and comminuted and dried in air for 24 hours on a clay plate. 68.4 g. of polyacrolein with a 61% dry substance content corresponding to a yield 74% of the theoretical were obtained. The molecular weight was determined viscosimetrically in an aqueous $SO_2$ solution and amounted to 700,000.

The catalyst employed was prepared by treating polyacrolein which still contained a little water with $SO_2$ in the presence of water until complete solution occurred. To reduce the $SO_2$ content of such a solution a portion thereof can be removed by passing nitrogen through the solution or treating it under vacuum. In some instances it is simpler to produce the catalyst with the corresponding amount of sodium or calcium bisulfite or other suitable bisulfite and, if desired, adding an equivalent amount of acid before or after the reaction.

EXAMPLE 2

2 cc. of a catalyst solution containing 14.8% of hexamethylene polyguanidine-hydrochloride of a K value of 42 (mol. wt. about 60,000) and 7.4% of $SO_2$ dissolved in water were added to a stirred mixture of 75 cc. of distilled acrolein and 100 cc. of water at 20° C. and stirring continued until the polymerization was completed in about 8 hours. Emulsion formation began after 1 hour and the polymer started flocking out after 3 hours. The maximum reaction temperature of 26° C. was reached after 2 hours. The reaction mixture was neither heated nor cooled. After the 8 hours' polymerization period the entire reaction mixture solidified to a white mass of polyacrolein which was scraped out after 15 hours' standing and comminuted and dried for 24 hours in air on a clay plate. 93 g. of polyacrolein of a dry substance content of 66.7% corresponding to a yield 85% of the theoretical were obtained. The molecular weight of the polyacrolein was 900,000.

The catalyst employed was prepared by saturating an aqueous 10% solution of hexamethylene polyguanidinehydrochloride (pH of the solution 8.4) with $SO_2$ until the solution attained a pH of about 4 and the $SO_2$ content then determined.

EXAMPLE 3

50 cc. of distilled acrolein and 125 cc. of water were mixed and 2 cc. of a catalyst solution containing 10% of polyacrolein of a molecular weight of 20,000 and 5.5% of $SO_2$ dissolved in water added thereto at 20° C. A white emulsion was formed after 3 hours' stirring and the temperature rose to 27° C. The mixture was stirred until the polymerization ended in about 5 further hours. No flocking out of the polymer occurred and a stable emulsion polymer was obtained as the reaction product. Dilute HCl was added to precipitate the polyacrolein from the emulsion and it was then filtered off, washed with water and dried in air on a clay plate. 25.4 g. of polyacrolein of a dry substance content of 84% corresponding to a yield 84% of the theoretical were obtained. The molecular weight of the polyacrolein was 280,000.

EXAMPLE 4

50 cc. of distilled acrolein were mixed with stirring with 125 cc. of water and 4 cc. of a catalyst solution containing 10% of polyacrolein of a molecular weight of 20,000 and 5.5% of $SO_2$ dissolved in water added thereto at 20° C. A white stable emulsion polymer was obtained after 8 hours' stirring. The maximum temperature attained during the polymerization was 30° C. The polyacrolein was recovered from such emulsion as in Example 3. 30.3 g. of polyacrolein of a dry substance content of 80% corresponding to a yield 80% of the theoretical were obtained. The molecular weight of the polyacrolein was 135,000.

EXAMPLE 5

2 cc. of a catalyst solution containing 17.5% of polyacrolein of a molecular weight of 30,000 and 10.5% of $SO_2$ dissolved in water were added to a stirred mixture of 75 cc. of distilled acrolein and 85 cc. of water at 20° C. The contents of the reaction vessel solidified to a white mass of polyacrolein after 8 hours' stirring. The maximum polymerization temperature reached was 27° C. After 24 hours' standing the solidified mass was pulverized and dried in air on a clay plate. 83 g. of polyacrolein with a dry substance content of 62.3% corresponding to a yield 91% of the theoretical were obtained. The molecular weight of the polyacrolein was 410,000.

EXAMPLE 6

2 cc. of a catalyst solution containing 10% of polyacrolein of a molecular weight of 40,000 and 5% of $SO_2$ dissolved in water were added to a stirred mixture of 75 cc. of distilled acrolein and 75 cc. of water at 20° C. The contents of the reaction vessel solidified to a white mass after 8 hours' stirring. The maximum polymerization temperature reached was 30° C. After 24 hours' standing the solidified mass was pulverized and dried in air on a clay plate. 98.5 g. of polyacrolein with a dry substance content of 46.8% corresponding to a yield 81% of the theoretical were obtained. The molecular weight of the polyacrolein was 350,000.

EXAMPLE 7

2 cc. of a catalyst solution containing 17.5% of polyacrolein of a molecular weight of 30,000 and 10.5% of SO₂ dissolved in water were added to a stirred mixture of 75 cc. of distilled acrolein, 100 cc. of water and 10 cc. of methanol at 20° C. The contents of the reaction vessel solidified to a white mass after about 8 hours' stirring. The maximum polymerization temperature was 27° C. After 24 hours' standing the solidified mass was powdered and dried in air on a clay plate. 34 g. of polyacrolein of a dry substance content of 66% corresponding to a yield 40% of the theoretical were obtained. The molecular weight of the polyacrolein was 270,000.

EXAMPLE 8

2 cc. of the same catalyst solution as used in Example 7 were added to a stirred mixture of 75 cc. of distilled acrolein, 100 cc. of water and 2.5 cc. of ethanol at 20° C. The contents of the reaction vessel solidified to a white mass after about 8 hours' stirring. After allowing the solidified mass to stand for 24 hours it was pulverized and dried in air on a clay plate. 75 g. of polyacrolein with a dry substance content of 44.5% corresponding to a yield 59% of the thoretical were obtained. The molecular weight of the polyacrolein was 480,000.

EXAMPLE 9

2 cc. of the same catalyst solution as in Example 7 were added to a stirred mixture of 75 cc. of distilled acrolein, 100 cc. of water and 4 cc. of ethylene glycol at 20° C. The contents of the reaction vessel solidified to a white mass after about 8 hours' stirring. The maximum polymerization temperature reached was 30° C. After 24 hours' standing the solidified mass was powdered and dried in air on a clay plate. 83 g. of polyacrolein with a dry substance content of 50.2% corresponding to a yield 72% of the theoretical were obtained. The molecular weight of the polyacrolein was 370,000.

When the 4 cc. of ethylene glycol were replaced by 1 cc. of glycerol and the polymerization otherwise carried out under the same conditions, 80 g. of polyacrolein with a dry substance content of 49.2% corresponding to a yield 69% of the theoretical were obtained. The molecular weight of the polyacrolein was 380,000.

EXAMPLE 10

2 cc. of a catalyst solution as used in Example 7 were added to a stirred mixture of 75 cc. of distilled acrolein, 100 cc. of water and 3 g. of polyformaldehyde at 20° C. The contents of the reaction vessel solidified to a white mass after about 8 hours' stirring. The maximum polymerization temperature reached was 25° C. After allowing the solidified mass to stand for 24 hours it was powdered and dried in air on a clay plate. 69 g. of polyacrolein with a dry substance content of 54.8% corresponding to a yield 66% of the theoretical were obtained. The molecular weight of the polyacrolein was 850,000.

EXAMPLE 11

15 g. of polyacrolein, obtained according to Example 9, having a dry substance content of 50.2% and a molecular weight of 370,000, were dispersed in 120 cc. of an aqueous 5% SO₂ solution by stirring. After standing for 15 hours at 20° C. a clear light yellow colored solution was obtained. 10 cc. of this solution were added to a solution of 20 cc. of polyvinyl alcohol in 80 cc. of water. From this mixture films and coatings were produced which upon drying were insoluble in boiling water.

EXAMPLE 12

2.5 cc. of an aqueous solution containing 17.5% of polyacrolein of a molecular weight of 30,000 and 10% of SO₂ were mixed with 2.85 cc. of a 5% aqueous solution of NaOH. This mixture had a pH of 7.5. This catalyst mixture was added with stirring to a mixture of 200 cc. of water and 75 cc. of acrolein at 20° C. The temperature rose in 5 minutes to 40° C. with the formation of a white polymer emulsion. The reaction was permitted to go to completion and the mixture stirred for a further 8 hours at 20–30° C. An emulsion polyacrolein of a molecular weight of 1,000 was obtained in a yield of 81.5% of the theoretical.

EXAMPLE 13

2 cc. of an aqueous solution containing 17.5% of polyacrolein of a molecular weight of 30,000 and 10% of SO₂ were mixed with 2 cc. of concentrated H₂SO₄. This mixture had a pH of <1. This catalyst mixture was added with stirring to a mixture of 125 cc. of water and 50 cc. of acrolein at 20° C. The mixture was stirred for 8 hours, without supplying external heat. During such stirring the temperature slowly rose to 30° C. An emulsion polyacrolein of a molecular weight of 20,000 was obtained in a yield of 79% of the theoretical.

EXAMPLE 14

4 cc. of an aqueous solution containing 17.5% of polyacrolein of a molecular weight of 30,000 and 10% of SO₂ were mixed with 1 cc. of concentrated H₂SO₄. This mixture had a pH of 1.5. This catalyst mixture was added with stirring to a mixture of 125 cc. of water and 50 cc. of acrolein at 20° C. The mixture was stirred for 8 hours, without supplying external heat. During such stirring the temperature slowly rose to 30° C. An emulsion polyacrolein of a molecular weight of 80,000 was obtained in a yield of 78% of the theoretical.

EXAMPLE 15

2 cc. of an aqueous solution containing 17.5% of polyacrolein of a molecular weight of 30,000 and 10% of SO₂ were mixed with 0.5 cc. of formamide. This mixture had a pH of 2. This catalyst mixture was added with stirring to a mixture of 125 cc. of water and 50 cc. of acrolein at 20° C. The mixture was stirred for 8 hours, without supplying external heat. During such stirring the temperature slowly rose to 30° C. An emulsion polyacrolein of a molecular weight of 150,000 was obtained in a yield of 64% of the theoretical.

EXAMPLE 16

2 cc. of an aqueous solution containing 17.5% of polyacrolein of a molecular weight of 30,000 and 10% of SO₂ were mixed with a solution of 0.3 g. sodium acetate in 2 cc. of water. The mixture had a pH of 3. This catalyst mixture was added with stirring to a mixture of 125 cc. of water and 50 cc. of acrolein at 20° C. The mixture was stirred for 15 hours, without supplying external heat. During such stirring the temperature slowly rose to 30° C. An emulsion polyacrolein of a molecular weight of 400,000 was obtained in a yield of 70% of the theoretical.

EXAMPLE 17

2 cc. of an aqueous solution containing 17.5% of polyacrolein of a molecular weight of 30,000 and 10% of SO₂ were mixed with 2 cc. of monomethyl formamide. The mixture had a pH of 3.5. This catalyst mixture was added with stirring to a mixture of 125 cc. and 50 cc. of acrolein at 20° C. The mixture was stirred for 8 hours, without supplying external heat. During such stirring the temperature rose to 30° C. An emulsion polyacrolein of a molecular weight of 700,000 was obtained in a yield of 82% of the theoretical.

EXAMPLE 18

2 cc. of an aqueous solution containing 17.5% of polyacrolein of a molecular weight of 30,000 and 10% of SO₂ were mixed with 0.6 g. sodium acetate in 2 cc. of water. The mixture had a pH of 4.5. This catalyst mixture was added with stirring to a mixture of 125 cc. of water and 50 cc. of acrolein at 20° C. The mixture was stirred for 15 hours, without supplying external heat. During such stirring the temperature rose to 30° C. A precipitated polyacrolein of a molecular weight of 1,200,000 was obtained in a yield of 33% of the theoretical.

EXAMPLE 19

2 cc. of an aqueous solution containing 17.5% of polyacrolein of a molecular weight of 30,000 and 10% of $SO_2$ were mixed with 2.2 cc. of a 5% aqueous solution of NaOH. The mixture had a pH of 6.8. This catalyst mixture was added with stirring to a mixture of 125 cc. of water and 50 cc. of acrolein at 20° C. The mixture was stirred for 8 hours, without supplying external heat. During such stirring the temperature rose to 30° C. A precipitated polyacrolein of a molecular weight of 8,400,000 was obtained in a yield of 22% of the theoretical.

This is a continuation-in-part of application Ser. No. 132,560, filed Aug. 21, 1961, now abandoned.

We claim:

1. A process for the catalytic polymerization of acrolein to produce polyacrolein of a predetermined approximate molecular weight between about 1,000 and 10,000,000 which comprises adjusting the pH of an aqueous solution of a polymeric substance selected from the group consisting of polyvinyl carbazole, polyvinyl amine, gelatine, polyvinyl alcohols, polyglycols, cellulose polyethers, polyguanidines, polyacroleins and polyvinyl pyrrolidones containing a bound sulfurous compound selected from the group consisting of sulfur dioxide, alkali metal bisulfites and alkaline earth metal bisulfites to correspond to that shown in the graph in the drawing for the predetermined molecular weight of the polyacrolein to be produced and contacting the acrolein with said aqueous solution as the sole polymerization catalyst to effect the polymerization of the acrolein.

2. The process of claim 1 in which the aqueous catalyst solution contains 1 to 50% of the polymeric component and 1 to 25% of the sulfurous compound calculated as sulfur dioxide.

3. The process of claim 2 in which 0.01 to 10% of catalyst calculated as acrolein is employed.

4. The process of claim 1 in which an addition product of polyacrolein and $SO_2$ is employed as the catalyst.

5. The process of claim 1 in which the polymeric component of the catalyst has a molecular weight between 10,000 and 100,000.

6. A process for the catalytic polymerization of acrolein which comprises contacting acrolein in contact with an alcohol selected from the group consisting of methanol, ethanol, ethylene glycol, glycerol and sugar with an aqueous solution of a polymeric substance selected from the group consisting of polyvinyl carbazole, polyvinyl amine, gelatine, polyvinyl alcohols, polyglycols, cellulose polyethers, polyguanidines, polyacroleins and polyvinyl pyrrolidones containing a bound sulfurous compound selected from the group consisting of sulfur dioxide, alkali metal bisulfites and alkaline earth metal bisulfites as the sole polymerization catalyst to initiate the catalytic polymerization of the acrolein.

7. A process of the catalytic polymerization of acrolein which comprises contacting acrolein in contact with polyformaldehyde with an aqueous solution of a polymeric substance selected from the group consisting of polyvinyl carbazole, polyvinyl amine, gelatine, polyvinyl alcohols, polyglycols, cellulose polyethers, polyguanidines, polyacroleins and polyvinyl pyrrolidones containing a bound sulfurous compound selected from the group consisting of sulfur dioxide, alkali metal bisulfites and alkaline earth metal bisulfites as the sole polymerization catalyst to initiate the catalytic polymerization of the acrolein.

References Cited by the Examiner

UNITED STATES PATENTS

| 3,068,203 | 12/1962 | Schweitzer et al. | 260—67 |
| 3,079,296 | 2/1963 | Houff et al. | 260—67 |

FOREIGN PATENTS

| 797,459 | 7/1958 | Great Britain. |
| 855,889 | 12/1960 | Great Britain. |

WILLIAM H. SHORT, *Primary Examiner.*

JOSEPH R. LIBERMAN, *Examiner.*

L. M. MILLER, H. D. ANDERSON, *Examiners.*